United States Patent [19]
Gilbert

[11] Patent Number: 5,762,296
[45] Date of Patent: Jun. 9, 1998

[54] PIVOT FOR REAR SEAT TRACK FITTING

[75] Inventor: Klay Ethan Gilbert, Lindsay, Tex.

[73] Assignee: Weber Aircraft, Inc., Gainesville, Tex.

[21] Appl. No.: 526,483

[22] Filed: Sep. 11, 1995

Related U.S. Application Data

[63] Continuation-in-part of Ser. No. 947,491, Sep. 21, 1992, Pat. No. 5,449,132, which is a continuation-in-part of Ser. No. 829,961, Feb. 3, 1992, Pat. No. 5,337,979.

[51] Int. Cl.$^6$ .................................... B64D 11/06
[52] U.S. Cl. ................ 244/118.1; 410/105; 410/115; 410/71
[58] Field of Search ................ 244/118.1, 122 R, 244/118.6; 410/101–105, 115, 77; 248/503.1

[56]         References Cited

U.S. PATENT DOCUMENTS

| | | |
|---|---|---|
| 2,889,167 | 8/1959 | Elsner . |
| 3,189,313 | 6/1965 | Burns et al. . |
| 3,620,171 | 11/1971 | Brenia et al. . |
| 3,622,202 | 11/1971 | Brown . |
| 3,652,050 | 3/1972 | Marrujo et al. . |
| 3,677,195 | 7/1972 | Prete, Jr. . |
| 3,810,534 | 5/1974 | Prete, Jr. . |
| 4,026,218 | 5/1977 | Prete, Jr. et al. . |
| 4,062,298 | 12/1977 | Weik . |
| 4,109,891 | 8/1978 | Grendahl . |
| 4,114,947 | 9/1978 | Nelson . |
| 4,230,432 | 10/1980 | Howell . |
| 4,256,424 | 3/1981 | Knox et al. . |
| 4,396,175 | 8/1983 | Long et al. . |
| 4,493,470 | 1/1985 | Engel . |
| 4,496,271 | 1/1985 | Spinosa et al. . |
| 4,509,888 | 4/1985 | Sheek . |
| 4,688,843 | 8/1987 | Hall . |
| 4,708,549 | 11/1987 | Jensen . |
| 4,718,719 | 1/1988 | Brennan . |
| 4,771,969 | 9/1988 | Dowd . |
| 4,776,533 | 10/1988 | Sheek et al. . |
| 4,796,837 | 1/1989 | Dowd . |
| 4,911,381 | 3/1990 | Cannon et al. . |
| 5,058,829 | 10/1991 | Bentley . |
| 5,169,091 | 12/1992 | Beroth . |

FOREIGN PATENT DOCUMENTS

| | | |
|---|---|---|
| 03 27 990 | 8/1989 | European Pat. Off. . |
| 25 56 000 | 6/1977 | Germany . |

*Primary Examiner*—Galen L. Barefoot
*Attorney, Agent, or Firm*—Crutsinger & Booth

[57]            ABSTRACT

A track fitting assembly for removably securing a seat through a swivel bearing to a generally channel-shaped track secured to the fuselage of an aircraft. The track fitting assembly includes a forged body member having spaced track lugs projecting laterally from a narrow finger portion. The body member has a socket which receives a threaded shear plunger adjusting screw such that a head on the adjusting screw moves into the socket to indicate when the shear plunger is properly seated to lock the track lugs in the track.

19 Claims, 4 Drawing Sheets

PIVOT FOR REAR SEAT TRACK FITTING

CROSS REFERENCE TO RELATED APPLICATIONS

This application is a Continuation-in-Part of application Ser. No. 07/947,491, filed Sep. 18, 1992 entitled "PASSENGER SEAT REAR TRACK FITTING" now U.S. Pat. No. 5,449,132, which was a Continuation-in-Part of application Ser. No. 07/829,961, filed Feb. 3, 1992 entitled TRACK FITTING FOR AIRCRAFT SEATS, now U.S. Pat. No. 5,337,979, issued Aug. 16, 1994.

TECHNICAL FIELD

The invention relates to an anti-rattle track fitting having a swivel bearing for securing a leg of a seat to a track mounted on the floor of an aircraft or other vehicle, the fitting having a visible indicator to confirm that the fitting is properly installed.

BACKGROUND OF INVENTION

The invention disclosed herein relates to improvements in track fittings of the type disclosed in Bentley U.S. Pat. No. 5,058,829, entitled "SEAT TRACK FITTING", which are commercially available from Weber Aircraft of Gainesville, Tex. Track fittings are employed for securing passenger seats to track rails in the floor of an aircraft. Track fittings vary in design due to the structural needs of the seat and the allowable strength of the aircraft.

Track rails in aircraft are generally C-shaped channels and have holes bored every inch along the length of flanges to allow installation of the seats at any position and adjustment between seats at 1 inch increments along the track. The seat track fittings generally have track fitting lugs, arranged in pairs on the bottom of the fitting, which have an inverted generally T-shaped cross section and have radii to allow them to be installed in the holes in the aircraft seat track rails.

The track fitting disclosed in Bentley U.S. Pat. No. 5,058,829 has a generally C-shaped shear plunger mounted to slide vertically on the track fitting body. A separate generally U-shaped anti-rattle device is moved by a screw to position ends of legs of the device in engagement with upper surfaces on the track to lift track fitting lugs into firm engagement with under surfaces of the track flanges. This patent discloses an anchor fitting having a one-piece body formed to include a substantially spherically shaped seat engagement housing connected to a track fitting member that allows freedom of movement of the connecting seat leg member relative to the anchor fitting.

Other patents disclosing spherical bearing fittings for securing seat legs to track fittings include Dowd U.S. Pat. No. 4,771,969; Dowd U.S. Pat. No. 4,796,837 and Schurr U.S. Pat. No. 5,083,726.

Processes required to manufacture and assemble spherical bearings in track fittings heretofore devised have been expensive and unduly time consuming. For example, press-fitting ring elements having concave surfaces into openings for retaining a spherical bearing in an opening in a track fitting is time consuming and expensive.

A track fitting, disclosed in Dowd U.S. Pat. No. 4,771,969 entitled "LEG SET TRACK FITTING", is commercially available from Sabre Industries, Inc. of Burbank, Calif. The fitting has a generally circular shear element, which pivots about a horizontal axis relative to one end of a finger extending into the groove in a track such that the shear element is movable into openings in the track to prevent movement of the fitting longitudinally of the track. The fitting is also provided with a yoke configured to straddle the finger and extend into openings in the track to prevent sliding movement and to prevent rattling. This type of fitting, made of three stainless steel castings which require a 100% X-Ray inspection of the castings to satisfy Federal Aviation Regulations, is very expensive to manufacture and is very difficult to install.

An additional track fitting, which is commercially available from Ancra Corporation of El Segundo, Calif., is disclosed in U.S. Pat. No. 4,256,424 entitled "RATTLE PROOF ANCHOR FITTING FOR SECURING LOADS TO A RETAINER TRACK". This fitting has a sliding shear plunger and a separate "U" shaped clamp member having flange surfaces which engage the track to prevent rattling.

Under certain conditions, track fittings of the type heretofore devised may be difficult to install because they must be in near perfect alignment with the seat track holes to engage properly. The fitting shear plunger must be snapped into the track hole and an adjustment screw must be turned to secure the anti-rattle device.

Some fittings utilize a single mechanism for the anti-rattle device and the shear plunger. However, this configuration is not the best, structurally, because the shear plunger is usually located between or aft of the fitting lug pairs. When the shear plunger is located between or aft of the fitting lug pairs, the track lip pairs that are forward of the shear plunger, react against both the shear plunger and one pair of fitting lug pairs in combination. Full track strength cannot be achieved in this configuration; however, this configuration is the easiest to access for installation and maintenance.

Kulczycki et al U.S. Pat. No. 3,847,344; Howell U.S. Pat. No. 4,230,432; Sheek et al U.S. Pat. No. 4,776,533; Beroth U.S. Pat. No. 5,169,091 and Beroth U.S. Pat. No. 5,178,346 disclose track fasteners. Beroth U.S. Pat. No. 5,169,091, referring to the structure disclosed in Howell U.S. Pat. No. 4,230,432, states that the seat may seem to be securely fastened to the track, but in fact the seat will some times come loose quite easily if not properly installed upon even slight stress being place on the seat or track fastener. It is further stated that a cursory inspection, particularly in bad lighting conditions, might lead an inspector to incorrectly conclude that the track fastener is properly locked when in fact it is not.

One track fitting which is commercially available uses a center plunger/anti-rattle device spring loaded in the up mode. The fitting is positioned over a hole in the track and a spring loaded adjuster is pushed down. The plunger drops down into the hole and the adjuster makes contact with mating threads in the fitting body. The adjuster is tightened to produce a snug fit and a small grub screw is tightened against the adjuster to prevent loosening. The small grub screw on the side of the fitting is a time consuming operation to be performed after the fitting is installed. This operation can be carelessly overlooked causing a non-secured fit of the track fitting.

If the shear plunger of track fittings heretofore devised is not located correctly, and the anti-rattle device is tightened, the track fitting can give a false appearance of a positive structural installation. The installation and removal of a seat from an aircraft is very time consuming, which is hampered by the fitting installation. Once the seat is installed in an aircraft, and the fitting is tightened, there exists no means of identification for confirming positive engagement between the track fitting and the track.

Other track fittings are disclosed in U.S. Pat. No. 3,189,313; U.S. Pat. No. 3,620,171; U.S. Pat. No. 3,652,050; U.S. Pat. No. 3,677,195; U.S. Pat. No. 3,810,534; U.S. Pat. No. 4,026,218; U.S. Pat. No. 4,062,298; U.S. Pat. No. 4,109,891; U.S. Pat. No. 4,114,947; U.S. Pat. No. 4,396,175; U.S. Pat. No. 4,493,470; U.S. Pat. No. 4,509,888; U.S. Pat. No. 4,688,843; U.S. Pat. No. 4,708,549; U.S. Pat. No. 4,718,719 and U.S. Pat. No. 4,911,381.

When a track fitting is removed from the track, the threaded adjusting screws may be bent or lost along with other fitting pieces. Further, the requirement that several tools be employed for installing or removing seats is undesirable. A track fitting with a visual identification is needed to ensure positive track engagement and to permit proper installation and removal of seats much more quickly than can be accomplished using track fittings of the type heretofore devised.

SUMMARY OF INVENTION

The track fitting disclosed herein is employed for movably securing a seat to conventional, generally channel shaped tracks having an elongated central groove and spaced circular openings formed in horizontally extended flanges. The disclosed embodiment of the track fitting includes a forged or machined steel fitting body, a shear plunger assembly and a machined steel threaded adjuster which connects the shear plunger assembly to the track fitting body. The threaded adjuster has a colored head which moves into an internally threaded socket in the track fitting body when the shear plunger assembly is seated in the circular openings formed in the track flanges.

A screwdriver or other basic tool is used for installing and removing the track fitting which locks firmly in position and will not move from its locked position in the track when subjected to design loads.

The head on the threaded adjuster provides an indicator which clearly and reliably indicates whether or not the track fitting is properly locked in position despite adjacent installation of carpet, track covers, seat structure and other visible obstructions.

The track fitting assembly is configured to assure that seats are not incorrectly installed in a manner which would affect the load carrying capability of the track fitting. The shear plunger assembly incorporates primary and secondary plunger heads which are received in openings in the track flanges such that torsional forces applied to the track fitting body is translated to force exerted on a first track lip segment in a first direction by the primary shear plunger and force exerted on a second track lip segment in a second direction by track lugs on the fitting body. This configuration prevents the application of compound loading on track lip segments which would prevent utilization of the full strength of the seat tracks.

In addition, the track fitting incorporates improvements for mounting a swivel bearing, having a spherical bearing surface, in an opening in a track fitting body. Spaced grooves are formed in the wall of an opening in the track fitting body and a pair of snap rings are positioned adjacent opposite sides of an enlarged spherical central portion of the bearing for retaining the bearing in the opening.

The track fitting having a swivel bearing for mounting the track fitting on the leg of a seat provides a structure having improved torque carrying capability required to withstand 16G loading. The threaded adjuster that connects the shear plunger to the track body has a threaded central portion and a painted head portion that is smaller in diameter than the threaded central portion. The painted screw head should be completely concealed in a socket formed in the track fitting if the fitting is properly installed and clearly indicates whether or not the track fitting is properly installed.

DESCRIPTION OF DRAWINGS

Drawings of a preferred embodiment of the invention are annexed hereto so that the invention may be better and more fully understood, in which.

Numeral references are employed to designate like parts throughout the various figures of the drawings.

DESCRIPTION OF A PREFERRED EMBODIMENT

The track fitting assembly, generally designated by the numeral 10 in the drawings, comprises a forged steel fitting body 20, a forged steel anti-rattle/shear plunger assembly 40, and a machined steel threaded adjuster 50.

The fitting body 20 and shear plunger 40 are preferably forged because the forging operation improves the quality of many metals. The coarse crystals of metal resulting from solidification in an ingot mold are kneaded and refined. Blow holes and layers of slag are consolidated and usually welded together. This results in a more ductile and stronger product than cast metal with much greater resistance to shock and to fatigue stresses. Hammer forging imparts a high degree of refinement on the surface of the work.

Figure 6:
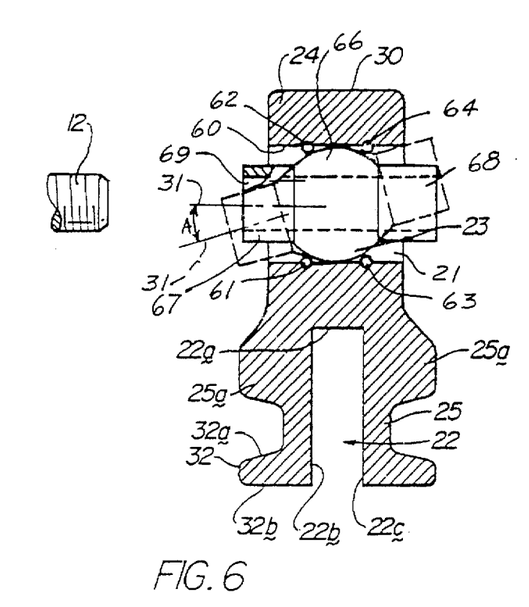
FIG. 6 is a cross-sectional view taken along line 6—6 of FIG. 3.
Figure 7:
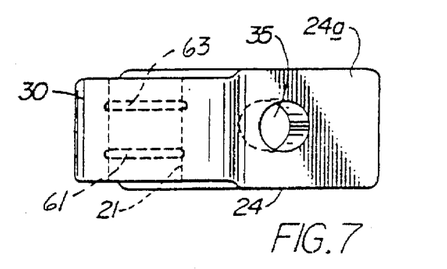
FIG. 7 is a top plan view of the track fitting body.
Figure 8:
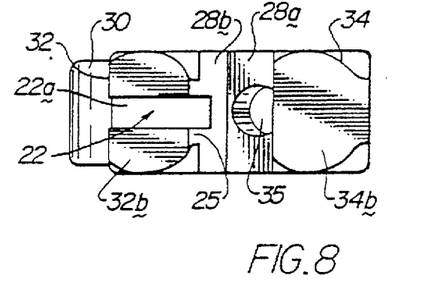
FIG. 8 is a bottom plan view thereof.

As best illustrated in FIGS. 6 and 8, body member 20 preferably comprises an enlarged upper boss portion 24 and a narrow elongated longitudinally extending lower finger portion 25 having a longitudinally extending slot 22 formed therein. A transversely extending channel 28 is formed in the lower portion of body 20 and intersects with slot 22 and an internally threaded socket 35 extends through surfaces 24a and 28a of fitting body 20 and communicates with channel 28, as will be hereinafter more fully explained.

Body 20 has bolt receiving passage 21, best illustrated in FIG. 6 of the drawing, extending through a cylindrical connector portion 30 on boss 24 in which a swivel bearing, generally designated by the numeral 65 is mounted. Passage 21 has a cylindrical wall 60 in which grooves 62 and 64 are formed, as will be hereinafter more fully explained.

Figure 9:
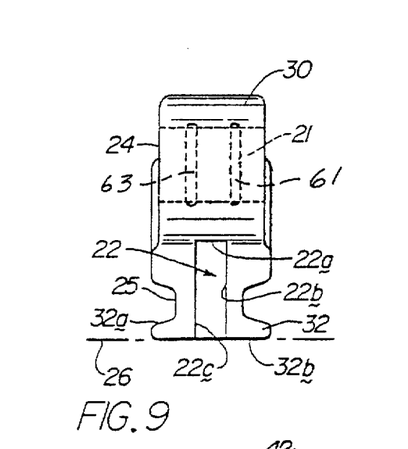
FIG. 9 is a front elevational view of the track fitting body.
Figure 10:
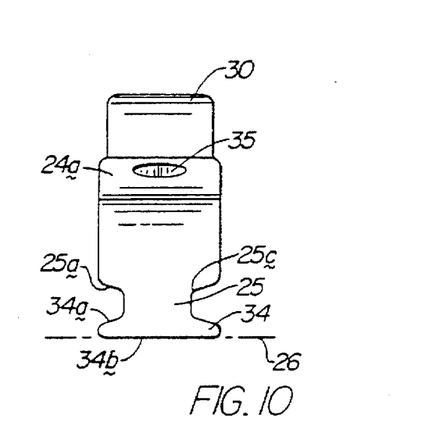
FIG. 10 is a rear elevational view of the track fitting body.

As illustrated in FIGS. 8 and 9 of the drawing, slot 22 having an open bottom and open ends is bounded by surfaces 22a, 22b and 22c.

Figure 3:
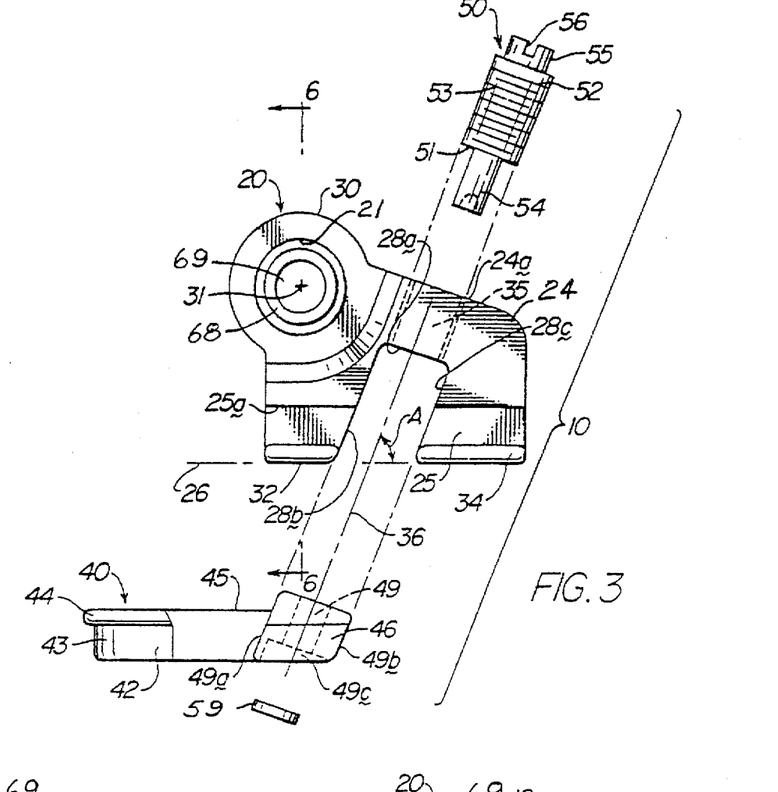
FIG. 3 is an exploded side elevational view of the track fitting.

As best illustrated in FIGS. 3 and 8 of the drawing, channel 28 is open at opposite ends and is bounded by surfaces 28a, 28b and 28c to form a receptacle of generally rectangular cross-section between track fitting lugs 32 and 34.

Shoulders 25a on boss portion 24 of fitting body 20 extend along upper edges of narrow finger 25. Filets 25c between shoulders 25a and finger portion 25 are preferably greater than 0.040 inch and preferably have a radius of at least 0.060 inch to reduce stress concentration.

Track fitting lugs 32 and 34 have upper surfaces 32a and 34a and lower surfaces 32b and 34b, respectively. Slot 22 extends through front track fitting lug 32 to form a bifurcated front track fitting lug 32 to accommodate the shear plunger assembly 40, as will be hereinafter more fully explained.

Lower surfaces 32b and 34b on track fitting lugs 32 and 34 preferably lie in a common plane 26. Referring to FIG. 3 of the drawing, it should be noted that surface 28a at the upper end of channel 28 is inclined at an angle relative to plane 26 while surfaces 28b and 28c bounding opposite sides of channel 28 are generally perpendicular to surface 28a and are inclined relative to plane 26. The axis 36 of threaded socket 35 is preferably parallel to surfaces 28b and 28c and is inclined relative to plane 26.

The axis 31 of passage 21 is parallel to plane 26 and extends through a generally cylindrical connector portion 30 formed on the end of track fitting body 20.

While connector portion 30 of the track fitting body is illustrated as a generally cylindrical lug in the illustrated embodiment of the drawing, it should be appreciated that it may be formed as a clevis having a slot formed therein to accommodate a lug on the leg of an aircraft seat.

Figures 1, 2:
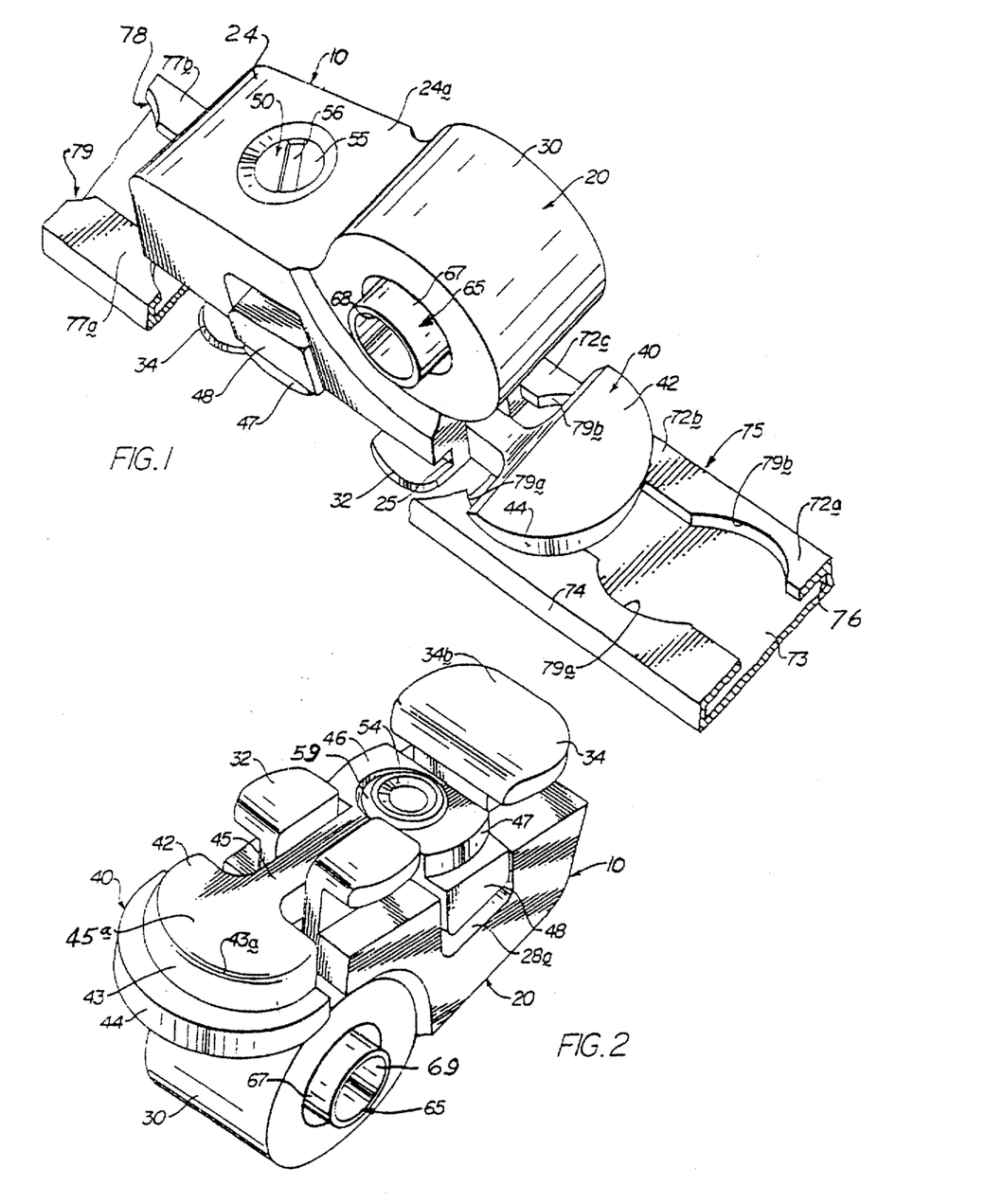
FIG. 1 is a perspective view of an aircraft seat track fitting.
FIG. 2 is a perspective view illustrating the bottom of the track fitting.
Figure 11:
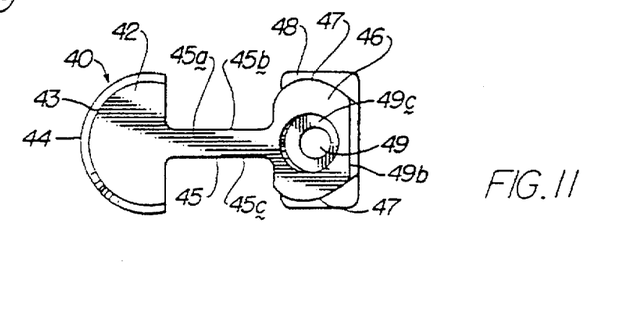
FIG. 11 is a bottom plan view of the shear plunger assembly.

Referring to FIGS. 2, 3 and 11 of the drawing, the numeral 40 generally designates a shear plunger having primary and secondary shear heads 42 and 46 formed on opposite ends thereof and a rigid connector bar 45 extending therebetween. The primary shear head 42 has a semi-circular front wall 43 and a semi-cylindrical rim 44 which extends outwardly from the upper edge of front wall 43.

The radius of curvature of front wall 43 is preferably slightly less than the radius of curvature of receptacles formed in track rails and rim 44 preferably has a radius of curvature slightly exceeding the radius of curvature of recesses formed in the track rails. The lower edge 43a of front wall 43 is preferably rounded or inclined to form a tapered guide surface to facilitate positioning primary shear head 42 in a receptacle in a track rail.

The secondary shear plunger head 46 has curved side surfaces 47 and front and rear surfaces 49a and 49b inclined at an angle "A" in a range of, for example, about 70 to 75 degrees relative to the bottom surface 45a of shear plunger assembly 40. When the secondary shear head 46 is positioned in channel 28 in track fitting body 20, the bottom surface 45a and plane 26 are substantially parallel.

Figure 5:
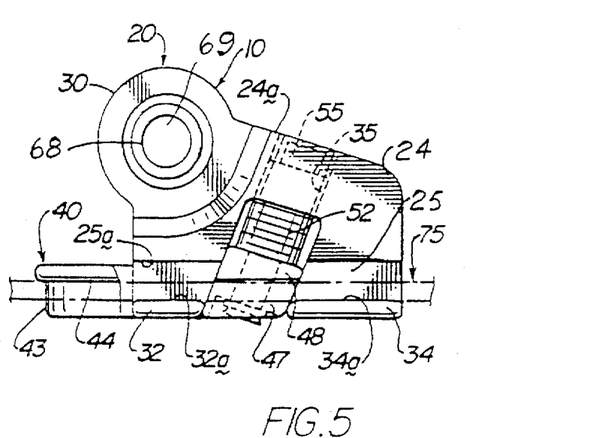
FIG. 5 is a side elevational view of a track fitting, the shear plunger assembly being illustrated in an extended position.

A passage 49 having a countersunk bore 49c is formed through the secondary shear head 46 and a flange 48 is formed on the upper end of secondary shear head 46 for engaging the upper surface of a track, as illustrated in FIG. 5 of the drawing, to pull upper surfaces 32a and 34a on track fitting lugs 32 and 34 into engagement with lower surfaces of track flange lips.

The connector bar portion 45 extends between the primary and secondary shear heads 42 and 46 and is configured to extend into slot 22 in track fitting body 20. With opposite sides 45b and 45c of connector bar 45 being positioned adjacent surfaces 22b and 22c adjacent opposite sides of slot 22 the primary shear head 42 is stabilized and horizontal forces are applied by the rear surface 49b on shear plunger assembly 40 to the shoulder 28c on track fitting body 20.

Figure 4:
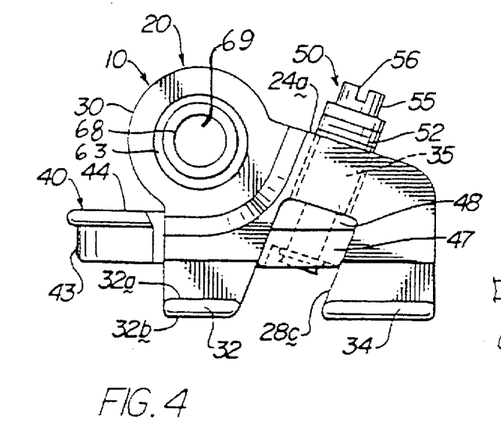
FIG. 4 is a side elevational view of the track fitting, the shear plunger assembly being illustrated in a retracted position.

As best illustrated in FIGS. 3, 4 and 5 of the drawing, an adjuster 50 comprises a screw having a threaded central portion 52, a stem 54 and a head 55. Stem 54 extends through passage 49 in secondary shear head 46 and through a washer 59. The lower end of stem 54 is then flared for rotatably securing adjuster 50 to shear plunger 40 to complete the assembly of the shear plunger assembly 40.

When the threaded central portion 52 of adjuster 50 is screwed into the threaded socket 35 formed in track fitting body 20, the head 55 is visible when the shear plunger assembly 40 is in the elevated position illustrated in FIG. 4 of the drawing. However, when adjuster 50 is rotated for moving shear plunger assembly 40 to the position illustrated in FIG. 5 of the drawing, the head 55 moves into the upper end of socket 35.

Head 55 on adjuster 50 and the body 20 of the track fitting assembly 10 are preferably different colors such that a visual inspection of head 55 clearly indicates whether or not shear plunger assembly 40 is in its fully extended position such that track fitting lugs 32 and 34 are captured under the track lips and shear heads 42 and 46 are seated in receptacles in the track.

Referring to FIG. 5 of the drawing, it should be readily apparent that the lower edge of the inclined front surface 49a on the secondary shear head 46 projects below and slightly forwardly of the rear edge of the track lip bounding the receptacle into which it extends such that a horizontal force applied to the front face 49a of secondary plunger head 46 tends to rotate the track fitting body 20 in a clockwise direction as illustrated in FIG. 5.

In the illustrated embodiment, the forged steel body 20 is provided with two lug pairs 32 and 34 and the forged steel anti-rattle shear plunger device 40 configured such that horizontal loads are primarily reacted by a track lip pair through the primary shear head 42 which sees no vertical loads.

The center of the plunger/anti-rattle device 40 is a secondary plunger 46 that can impose horizontal load against the tract lip pairs that are just forward. In this sense, the fitting 10 has multiple plungers. However, the secondary shear plunger 46 is configured such that it has a smaller area of contact with the track flange than the primary shear plunger 42. The secondary shear plunger 46 preferably carries less than about 25% of the shear load carried by primary shear head 42.

The fitting uses a single threaded adjuster 50 to raise and lower the shear plunger device 40. The threaded adjuster 50 has a slot 56 on the top for a standard screwdriver, but can have a hex recess, phillips head recess or other means of tool adjustment. The threaded adjuster is placed through the hole 49 in the shear plunger 40 and a washer 59 is placed in the counter bored end 49c of the shear plunger.

The end of the threaded adjuster 50 is flared or staked, holding the adjuster 50 on the shear plunger 40 while still allowing it to turn. Once the adjuster assembly is complete, it is assembled to the fitting body 20.

One of the threads 53 is deformed to produce a locking element to guard against looseness. The top of the threaded adjuster is painted red or chemically treated to provide a contrasting color to the fitting body.

The colored top of the adjuster will provide the inspector a visual means of identifying the positive security of the fitting in the aircraft track.

For the best utilization of the track strength, the primary shear plunger 40 should be placed directly forward of the track lip pairs. With this configuration the track lip pairs do not react to combined loads, in other words, horizontal loads are reacted by one pair of track lips and vertical loads are reacted by two different pairs of track lips.

As hereinbefore explained, body 20 has a bolt receiving passage 21, best illustrated in FIG. 6 of the drawing, extending through a cylindrical connector portion 30 on boss 24 in which swivel bearing 65 is mounted. Passage 21 has a cylindrical wall 60 in which grooves 62 and 64 are formed.

Swivel bearing 65 has a hollow spherical central portion 66 and tubular end portions 67 and 68. A passage 69 extends through the tubular end portions 67 and 68 and through the spherical central portion 66 for receiving a bolt 12 for connecting body 20 to a seat leg (not shown).

Snap rings 61 and 63 extend into grooves 62 and 64 and engage swivel bearing 65 adjacent opposite sides of the spherical central portion 66 to prevent disengagement of swivel bearing 65 from passage 21.

Swivel bearing 65 has a central axis which can pivot about 15° in any direction from the full outline position illustrated in FIG. 6 to the position illustrated in dashed outline. Thus, the fitting body 20 can gimble plus or minus 15°.

Snap rings 61 and 63 are conventional split resilient substantially circular rings that can be compressed to a reduced diameter for insertion into passage 21. When split rings 61 and 63 are positioned adjacent grooves 62 and 64, rings 61 and 63, unless restrained, will expand and seat in grooves 62 and 64.

The outer spherical surface of the central portion 66 of swivel bearing 65 engages inner surfaces of snap rings 61 and 63 such that any effort to move swivel bearing 65 longitudinally of passage 21 will exert force on snap rings 61 and 63 urging them outwardly. Walls of grooves 62 and 64 prevent enlargement of the inside diameter of snap rings 61 and 63 after the snap rings are seated in grooves 62 and 64.

Referring to FIG. 1 of the drawing, the conventional seat track 75 comprises a generally channel-shaped member bolted or otherwise secured to the fuselage of an aircraft. A typical track comprises a bottom wall 73 extending between spaced side walls 74 and 76 which have inwardly extending flange portions 77a and 77b spaced apart to form a groove 78 extending longitudinally of the track 75. Generally crescent shaped openings 79a and 79b are formed in flanges 77a and 77b to form a series of circular receptacles 79 spaced longitudinally of track 75 and having track lip segments 72a, 72b, 72c extending between the openings. The receptacles 79 formed by crescent shaped openings 79a and 79b are typically spaced on one inch (2.54 cm.) centers along the length of the track and generally have a diameter of approximately 1.00 inch (2.54 cm.). Track 75 is of conventional design and forms no part of the invention except in combination with the seat leg and track fitting assembly 10 described herein. A portion of a typical track 75 is illustrated in FIG. 1 of the drawing to illustrate the cooperative relationship between track fittings 10 and the track 75. It will be appreciated that track section 75 has a typical cross-section and that other configurations may be employed, for example, tracks of the type disclosed in U.S. Pat. Nos. 3,652,050; 4,109,891; 4,114,947; 4,493,470; and 4,911,381.

It should be readily apparent that tracks 75 and track fitting assemblies 10 may be employed for mounting structure other than aircraft seats, such as cargo pallets or tie-down straps to the floor of aircraft, trucks, ships, buildings and other structures or for mounting seats in busses, trains and other vehicles.

The finger portion 25 of the body 20 of the track fitting assembly has a width which is equal to or less than the width of the groove 78, formed between flanges 77a and 77b of track 75, such that finger portion 25 is positionable in groove 78 to position the lower surfaces 32b and 34b on lugs 32 and 34 in sliding engagement with the upper surface of the bottom wall 73 of track 75.

The narrow finger portion 25 of each track fitting has a plurality of spaced track lugs 32 and 34 formed thereon, track lugs 32 and 34 being equally spaced and corresponding to the spacing of receptacles 79 formed by crescent-shaped recesses 79a and 79b formed in flanges 77a and 77b of track 75. Upper surfaces 32a and 34a of track lugs 32 and 34 are positioned adjacent the lower side of flanges 77a and 77b in track 75 when primary shear plunger head 42 and secondary head 46 are seated in spaced receptacles 79. Plunger heads 42 and 46 are spaced apart a distance equal to the spacing of track lugs 32 and 34. However, the spacing between track lug 34 and plunger head 32 is one half the spacing between track lugs 32 and 34. Thus, when plunger heads 42 and 44 enter receptacles 79 formed by crescent-shaped recesses 79a and 79b, upper surfaces of track lugs 32 and 34 are positioned below the lip segments of flanges 77a and 77b extending between the crescent-shaped recesses 79a on flange 77a preventing vertical movement of track lugs 32 and 34 relative to track 75. Plunger heads 32 and 34 prevent movement of track fitting body 20 longitudinally of track 75 until plunger heads 42 and 44 are elevated from the position illustrated in FIG. 5 of the drawing.

Figure 12:
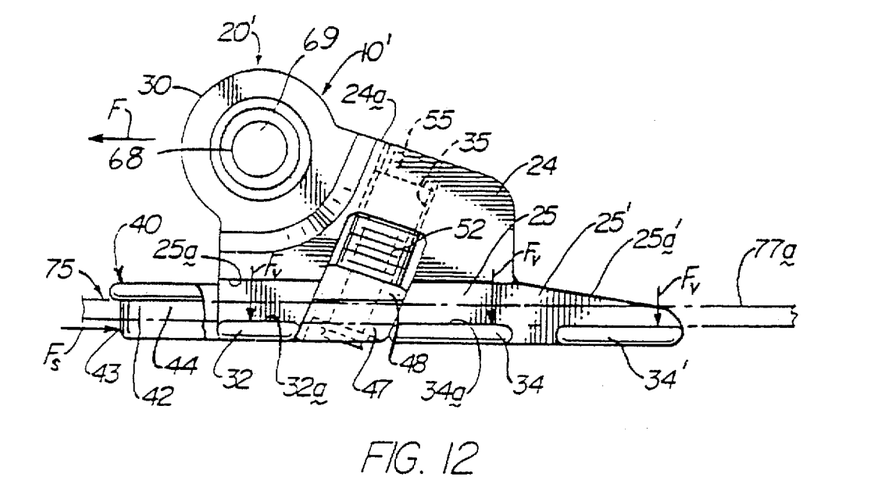
FIG. 12 is a side elevational view, similar to FIG. 5, of a second embodiment.
Figure 13:
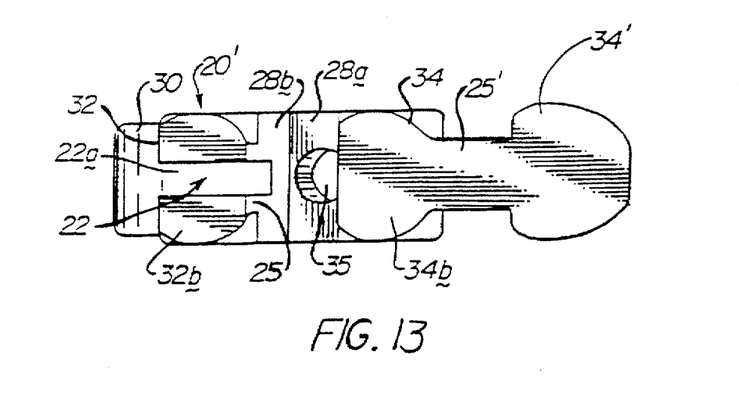
FIG. 13 is a bottom plan view of the second embodiment of the track fitting body.

A second embodiment 20' of the track fitting body is illustrated in FIGS. 12 and 13 of the drawing. The track fitting body 20' is substantially identical to track fitting body 20 except that a portion 25' of the narrow longitudinally extending lower finger 25 projects beyond the end of the enlarged upper boss portion 24 to support a third track fitting lug 34'.

As best illustrated in FIG. 12 of the drawing, the upper surface of portion 25' of the finger is inclined to form a tapered support for track fitting lug 34'. The upper surface 25a' of finger portion 25' drops below the upper surfaces of track flanges 77a and 77b so that it does not encroach on passenger space in the area immediately behind the rear leg of the seat upon which the track fitting assembly 10' is mounted.

From the foregoing, it should be readily apparent that in the event of a crash landing the seat leg (not shown) applies a force F to the cylindrical connector portion 30 of track fitting 10'. The track lip segments on track 75 in front of primary shear head 42 apply reactive shear force $F_s$ to the front wall 43 of primary shear head 42. Track lip segments rearwardly of primary shear head 42 apply generally vertical forces $F_v$ to track fitting lugs 32, 34 and 34'.

Track fitting lugs 32, 34 and 34' are positioned through spaced openings 79 in track 75 and moved longitudinally of the track for positioning the lugs below lip flange segments on the track. The threaded adjuster 50 cannot be screwed into boss portion 24 of body 20' to the position illustrated in FIG. 12 such that head 55 is concealed in threaded socket 35 unless the primary shear head 42 has been properly seated in one of the track fitting openings 79. Thus, if track fitting lugs 32, 34 and 34' are not visible and the head 55 on threaded adjuster screw 52 is concealed in threaded socket 35, this quickly and accurately indicates that the track fitting assembly 10' is properly installed.

Terms such as horizontal, vertical, upper and lower are used to describe the illustrated embodiments of the invention and should not be construed as limiting the scope of the invention.

There currently exists the need for a track fitting that is inexpensive, is simple, is easy to engage and disengage, uses simple tools to install, utilizes the full strength of the seat tracks, provides assurance the fitting is properly installed, and can withstand the loads produced by a 16G impact.

Having described the invention, I claim:

1. A shear plunger assembly for use in combination with a track fitting body for removably securing a seat leg to a generally channel-shaped track having an elongated groove formed between a pair of flanges, each of the flanges having spaced openings positioned to form a series of spaced receptacles having flange lip segments between the receptacles, wherein at least a portion of the track fitting body is a first color and has a threaded socket and a finger portion which has a width less than the width of the groove formed in the track and a plurality of spaced track lugs projecting laterally from the finger portion, said shear plunger assembly comprising:

a shear head on the shear plunger assembly;

mounting means for mounting said shear head on the track fitting body, said mounting means positioning said shear head a distance relative to the track fitting lugs which is not equal to the distance between adjacent spaced receptacles in the track; and a screw having a threaded central portion, a stem portion and a painted head portion, said painted head portion being painted a second color and having a smaller outside diameter than said threaded portion and a smaller outside diameter than said threaded socket, said screw being connectable between said shear head and the track fitting body for moving said shear head relative to the track fitting body, said painted head portion of said screw being concealed in the threaded socket when said shear head is positioned in a receptacle in the track flange to prevent movement of the track fitting lugs longitudinally of the track, said painted head portion being clearly visible when said shear head is not properly positioned in a receptacle in the track flange.

2. A shear plunger assembly according to claim 1, said mounting means positioning said shear head such that horizontally directed force resisting movement of the track fitting body longitudinally of the track is applied to said shear head by a first flange lip segment and vertically directed force resisting movement of the track fitting body vertically relative to the track is applied to track fitting lugs by a second track flange lip segment spaced from the first track flange lip segment such that combined horizontally and vertically directed forces are not applied to said first and second flange lip segments.

3. A shear plunger assembly according to claim 1, said shear head having surfaces which engage upper surfaces on the track flanges for positioning track lugs on the track fitting body in engagement with lower surfaces on the track flanges.

4. A shear plunger assembly according to claim 1, said shear head comprising: a primary shear head; a secondary shear head; and a connector portion extending between said primary and secondary shear heads, such that said primary and secondary shear heads are moved as a single unit by said screw.

5. A shear plunger assembly according to claim 4, said secondary shear head having a passage formed therein, said threaded adjuster having a stem; and means securing said stem in said passage in said secondary shear head.

6. A track fitting connectable to a track having an elongated groove formed between track flanges and having spaced openings separated by flange lip segments, said track fitting comprising:

a forged steel track fitting body having a threaded socket;

generally T-shaped track lugs on said track fitting body;

a shear plunger;

a screw having a threaded central portion, a stem portion and a painted head portion, said painted head portion being painted and having a smaller outside diameter than said threaded portion and a smaller outside diameter than said threaded socket, said screw being connectable between said shear head and the track fitting body for movably securing said shear plunger to said track fitting body for positioning said shear plunger in an opening in the track flanges such that torsional forces applied to said track fitting body is translated to a first force vector exerted on a first track lip segment in a first direction by said shear plunger and a second force vector exerted on a second track lip segment in a second direction by said track lugs, wherein said painted head portion on said screw is completely concealed in said socket to confirm that said shear plunger is properly seated in one of the openings in the track flanges to prevent movement of said track lugs longitudinally of the track, said track fitting body and said painted head portion on said screw being different colors.

7. A track fitting according to claim 6, said track fitting body having a bolt receiving passage formed therein, said passage having a wall with spaced groves, and with the addition of:

a swivel bearing having a hollow spherical central portion, tubular end portions and a bore for receiving a bolt for connecting said body to a seat leg; and snap rings extending into said grooves and engaging said swivel bearing adjacent opposite sides of said spherical central portion to prevent disengagement of said swivel bearing from said passage.

8. A track fitting according to claim 7, said passage having a central axis and said swivel bearing having an axis which can pivot about 15° in any direction relative to said central axis.

9. A track fitting according to claim 7, said snap rings comprising:

split resilient substantially circular rings that can be compressed to a reduced diameter for insertion said passage and allowed to expand and seat in said grooves.

10. A track fitting to removably secure a seat leg on a seat to a track having an elongated groove formed between a pair of flanges, each of the flanges having spaced openings having flange lip segments extending between the openings, said track fitting comprising:

an elongated fitting body having an enlarged boss portion and a finger portion which has a width less than the width of the groove formed in the track, said fitting body having first, second and third spaced track lugs extending laterally from said finger portion, said finger portion extending along substantially the entire length of said body, said enlarged boss portion being formed adjacent a first end of said finger portion, a second end of said finger portion having an upper surface which lies below surfaces of the track flanges when said third track lug is positioned below said tract flanges, said body having an internally threaded socket communicating with a channel formed in said body, said channel extending through said finger portion to form a pair of shoulders adjacent opposite sides of said channel;

swivel bearing means for pivotally securing said body to the seat leg;

shear plunger means in said channel, said shear plunger means having a primary shear head, a secondary shear head, and a connector extending between said primary and secondary shear heads such that said primary and secondary shear heads move as a unit, said primary and secondary shear heads and said track fitting lugs having a width greater than the width of the groove formed in the track, said shear plunger means having surfaces positioned between said shoulders such that said shoulders limit movement of said plunger means longitudinally of said fitting body; and an adjusting screw having a threaded central portion, a stem and a screw head, said stem being rotatably secured to said shear plunger means to move said shear plunger means in said channel transversely of said body member between an elevated position wherein the lower end of said plunger means is retracted from the spaced openings formed in the track and a seated position wherein the lower end of said shear plunger means is seated in an opening in the track flanges, said screw head and said body member being of contrasting colors and shaped to provide visual means to confirm that said track fitting lugs are secured relative to the track flanges and that said primary and secondary shear heads are seated in openings in the track flanges.

11. A track fitting according to claim 10, said track fitting body having a bolt receiving passage formed therein, said passage having a wall with spaced groves, and wherein said swivel bearing means comprises:

a swivel bearing having a hollow spherical central portion, tubular end portions and a bore for receiving a bolt for connecting said body to a seat leg; and snap rings extending into said grooves and engaging said swivel bearing adjacent opposite sides of said spherical central portion to prevent disengagement of said swivel bearing from said passage.

12. A track fitting according to claim 11, said passage having a central axis and said swivel bearing having an axis which can pivot about 15° in any direction relative to said central axis.

13. A track fitting according to claim 11, said snap rings comprising:

split resilient substantially circular rings that can be compressed to a reduced diameter for insertion said passage and allowed to expand and seat in said grooves.

14. A track fitting according to claim 10, said shear plunger means comprising: a shear head having a pair of spaced parallel surfaces engageable with said shoulders and a lower surface movable between a first position wherein the lower surface of the plunger and the lower surface of the elongated finger are positioned adjacent to a common plane and a second position wherein the lower end of the plunger is elevated above the plane.

15. A track fitting according to claim 10, said body member comprising: a forged elongated fitting body, said narrow finger portion extending along substantially the entire length of said body member, said enlarged boss portion being formed adjacent one end of said fitting body member; and a hub formed on said fitting body member adjacent said boss portion, said hub having a hole extending therethrough.

16. A track fitting according to claim 10, said body having a transversely extending channel formed therein, said shear plunger means extending into said channel.

17. A track fitting according to claim 10, said finger portion of said body having a longitudinally extending slot, said shear plunger means having a head portion, a stem portion and a shoulder portion, said stem portion extending through said slot and said shoulder portion being movable through said channel.

18. A track fitting according to claim 10, said shear plunger means having a pair of spaced parallel surfaces engageable with said shoulders and a lower surface movable between a first position wherein the lower surface on the plunger and the lower surface on the elongated finger are positioned adjacent a plane and a second position wherein the lower surface on the plunger is elevated above the plane.

19. A track fitting connectable to a track having an elongated groove formed between track flanges and having spaced openings separated by flange lip segments, said track fitting comprising: a track fitting body having a bolt receiving passage and an internally threaded socket formed in a surface, said socket communicating with a channel formed in said body;

T-shaped track lugs on said track fitting body;

a shear plunger assembly extending into said channel;

a threaded screw movably securing said shear plunger assembly to said body, said screw having a painted head that is smaller in diameter than said internally threaded socket that moves into said socket when said shear plunger assembly is in position to lock said body to said track, such that said painted screw head is below said surface and concealed from view, said bolt receiving passage having spaced grooves;

a swivel bearing in said bolt receiving passage; and snap rings in said grooves for movably securing said swivel bearing in said passage.

* * * * *